(12) United States Patent
Watanabe

(10) Patent No.: US 11,553,099 B2
(45) Date of Patent: Jan. 10, 2023

(54) PRINTING APPARATUS AND CONTROL METHOD THEREFOR

(71) Applicant: SEIKO EPSON CORPORATION, Tokyo (JP)

(72) Inventor: Ikumi Watanabe, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 11 days.

(21) Appl. No.: 17/156,891

(22) Filed: Jan. 25, 2021

(65) Prior Publication Data
US 2021/0234979 A1   Jul. 29, 2021

(30) Foreign Application Priority Data
Jan. 27, 2020   (JP) .............................. JP2020-010687

(51) Int. Cl.
| | |
|---|---|
| H04N 1/00 | (2006.01) |
| G06K 15/00 | (2006.01) |
| B65H 37/04 | (2006.01) |
| B65H 37/06 | (2006.01) |

(52) U.S. Cl.
CPC ......... *H04N 1/00639* (2013.01); *B65H 37/04* (2013.01); *B65H 37/06* (2013.01); *G06K 15/4065* (2013.01); *H04N 1/0057* (2013.01); *G06K 2215/0082* (2013.01); *H04N 2201/0082* (2013.01)

(58) Field of Classification Search
CPC combination set(s) only.
See application file for complete search history.

(56) References Cited

U.S. PATENT DOCUMENTS

| | | | |
|---|---|---|---|
| 2004/0156649 A1* | 8/2004 | Asai ................... | G03G 15/6508 399/82 |
| 2013/0201520 A1 | 8/2013 | Sato | |
| 2015/0029549 A1* | 1/2015 | Murata ............. | G06K 15/1809 358/1.15 |
| 2015/0213347 A1* | 7/2015 | Anno ................... | G06F 3/1211 358/1.9 |

FOREIGN PATENT DOCUMENTS

| | | |
|---|---|---|
| JP | 2013-161374 | 8/2013 |
| JP | 2014-118236 | 6/2014 |
| JP | 2019-171725 | 10/2019 |

* cited by examiner

*Primary Examiner* — Jennifer Bahls
(74) *Attorney, Agent, or Firm* — Workman Nydegger

(57) ABSTRACT

A printing apparatus includes a printing unit, a post-processing unit, and a controller. The controller includes a paper-type setting section configured to set a paper type of a paper feeding section, a storing section configured to store a plurality of paper types for which specific post processing is possible, and a control executing section. The printing output data includes paper type designation information, paper feeding section designation information, and post-processing designation information. When the post-processing designation information designates selection of the specific post processing and predetermined conditions including a condition that a paper type of second paper set by the paper-type setting section coincides with any one of the plurality of paper types stored in the storing section are satisfied, the control executing section controls the printing unit and the post-processing unit according to the paper feeding section designation information and the post-processing designation information irrespective of designation by the paper type designation information.

10 Claims, 7 Drawing Sheets

PRINTING APPARATUS AND CONTROL METHOD THEREFOR

The present application is based on, and claims priority from JP Application Serial Number 2020-010687, filed Jan. 27, 2020, the disclosure of which is hereby incorporated by reference herein in its entirety.

BACKGROUND

1. Technical Field

The present disclosure relates to a printing apparatus including a printing unit and a post-processing unit.

2. Related Art

JP-A-2014-118236 (Patent Literature 1) discloses an image forming system including an image forming apparatus that performs printing on a sheet and a post-processing apparatus that performs binding on a sheet bundle as post processing after the printing. This system controls, based on at least one kind of sheet information among a type, thickness, and basis weight of sheets included in the sheet bundle, whether to prohibit the binding. Depending on a printing system, other kinds of post processing such as punching and stapling are possible as the post processing other than the binding.

However, when a user desires to use different kinds of paper for a text and a cover, a print intended by the user sometimes cannot be obtained. For example, when the user intends to print the text using plain paper and print the cover using thick paper, the post processing by the post-processing apparatus cannot be performed on the cover. As a result, it is likely that a post-processed print intended by the user cannot be obtained.

SUMMARY

A printing apparatus according to an aspect includes: a printing unit including a first paper feeding section on which first paper is placed, a second paper feeding section on which second paper is placed, and a printing section configured to execute printing according to printing output data; a post-processing unit configured to execute one or more post processing, including a specific post processing, on the first paper and the second paper; and a controller configured to control the printing unit and the post-processing unit. The controller includes: a paper-type setting section configured to set a paper type of the first paper and a paper type of the second paper; a storing section configured to store a plurality of paper types for which the specific post processing by the post-processing unit is possible; and a control executing section configured to execute control according to the printing output data. The printing output data includes: paper type designation information that designates a paper type of paper for text and a paper type of paper for cover used for printing; paper feeding section designation information that designates the first paper feeding section as a paper feeding section for the paper for the text and designating the second paper feeding section as a paper feeding section for the paper for the cover; and post-processing designation information that designates one of non-implementation of the post processing and selection of the post processing executed by the post-processing unit. When the post-processing designation information designates the selection of the specific post processing and predetermined conditions including a condition that the paper type of the second paper set by the paper-type setting section coincides with any one of the plurality of paper types stored in the storing section are satisfied, the control executing section executes operation control that controls the printing unit and the post-processing unit according to the paper feeding section designation information and the post-processing designation information irrespective of the designation by the paper type designation information.

A method of controlling a printing apparatus including a post-processing unit configured to execute one or more post processing including a specific post processing according to an aspect includes: storing a plurality of paper types for which the specific post processing by the post-processing unit is possible; setting, in the printing apparatus, a paper type of first paper placed on a first paper feeding section and a paper type of second paper placed on a second paper feeding section; executing printing according to printing output data; and executing the post processing on the first paper and the second paper. The printing output data includes: paper type designation information that designates a paper type of paper for text and a paper type of paper for cover used for the printing; paper feeding section designation information that designates the first paper feeding section as a paper feeding section for the paper for the text and designating the second paper feeding section as a paper feeding section for the paper for the cover; and post-processing designation information that designates one of non-implementation of the post processing and selection of the post processing executed by the post-processing unit. when the post-processing designation information designates selection of the specific post processing and predetermined conditions including a condition that the paper type of the second paper set coincides with any one of the plurality of paper types are satisfied, controlling the printing and the post processing according to the paper feeding section designation information and the post-processing designation information irrespective of the designation by the paper type designation information.

DESCRIPTION OF EXEMPLARY EMBODIMENTS

Figure 1:
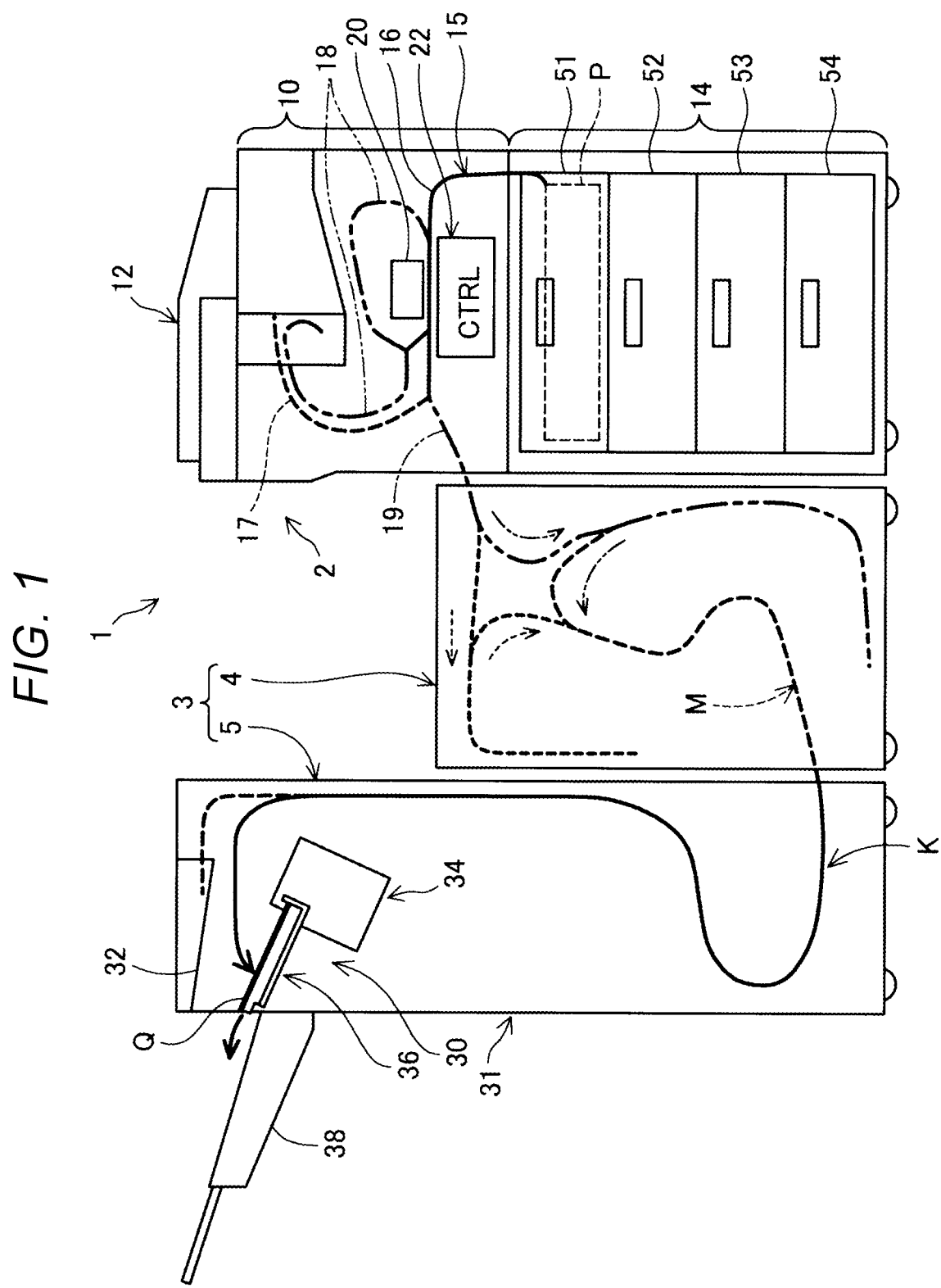
FIG. 1 is a conceptual diagram of a printing apparatus.

FIG. 1 is a conceptual diagram of a printing apparatus 1. The printing apparatus 1 includes a printing unit 2 and a post-processing unit 3. The printing unit 2 and the post-processing unit 3 are mechanically and electrically coupled to each other and are configured to be capable of conveying a printing medium P from the printing unit 2 to the post-processing unit 3. In the printing unit 2, a control section 22 that controls the printing unit 2 and the post-processing unit 3 is provided. Further, a not-shown operation panel is provided in the printing unit 2. The operation panel is configured such that various settings for the printing unit 2 and the post-processing unit 3 can be input to the operation panel.

The printing unit 2 includes a printing section 10, a scanner section 12, and a cassette housing section 14. The scanner section 12 is a mechanism for reading information of a document and is used when the printing apparatus 1 is used as a copy machine and when a scan result is transmitted to other apparatuses. However, the scanner section 12 can be omitted.

The printing section 10 includes a printing head 20. The printing head 20 is a head of an inkjet type and ejects ink to a printing medium P. As the printing medium P, usually, paper formed as a singled sheet is used. In the following explanation, the printing medium P is referred to as "paper P".

The cassette housing section 14 includes a plurality of paper cassettes 51 to 54 that house paper P. A conveying path 15 on which the paper P is conveyed is formed in the printing section 10 and the cassette housing section 14. The conveying path 15 includes a paper feeding path 16, a discharging path 17, a reversing path 18, and a delivery path 19. In the conveying path 15, the paper P is conveyed from the paper cassettes 51 to 54 to right under the printing head 20 and further conveyed to the post-processing unit 3.

The post-processing unit 3 includes an intermediate unit 4 that conveys the paper P received from the printing unit 2 and an end unit 5 that collectively post-processes a necessary number of pieces of the paper P received from the intermediate unit 4. The post-processing unit 3 accumulates a plurality of pieces of the paper P printed by the printing section 10 in a post-processing tray 36 as a paper bundle Q and executes post processing on the paper bundle Q. The post processing can be selected out of a plurality of kinds of post processing including stapling, punching, saddle stapling, saddle folding, and shifting. The "stapling" is processing for binding a corner portion or a side portion of the paper bundle Q with staples. The "punching" is processing for opening a plurality of punch holes in the paper bundle Q. The "saddle stapling" is processing for aligning and stacking a cover and a text and binding the center of the cover and the text with staples to thereby finish the cover and the text like a booklet. The "saddle folding" is processing for folding paper in the center of the paper. The "shifting" is processing for shifting a paper discharge position for each of documents to make it easy to sort paper. The post-processing unit 3 may be configured to be capable of executing post processing other than these kinds of processing or may be configured to be capable of executing one kind of post processing.

The intermediate unit 4 conveys the paper P received from the printing unit 2 and passes the paper P to the end unit 5. In the intermediate unit 4, a conveying path M configured by a plurality of paths on which the paper P received from the printing unit 2 is conveyed is formed. In the conveying path M, the paper P is switched back on one of paths of two systems. The intermediate unit 4 may be omitted to directly convey the paper P from the printing unit 2 to the end unit 5.

The end unit 5 includes a medium discharging section 30 and a post-processing executing section 34 that performs post processing on the paper bundle Q including a plurality of pieces of paper P. The medium discharging section 30 and the post-processing executing section 34 are housed in a housing 31. The housing 31 includes an upper tray 32 and a discharge tray 38 on which the paper P is placed. In the housing 31, a conveying path K on which the paper P is conveyed from the intermediate unit 4 is formed. The paper P not post-processed by the post-processing executing section 34 is discharged to the upper tray 32. The paper P post-processed by the post-processing executing section 34 is discharged to the discharge tray 38.

Figure 2:
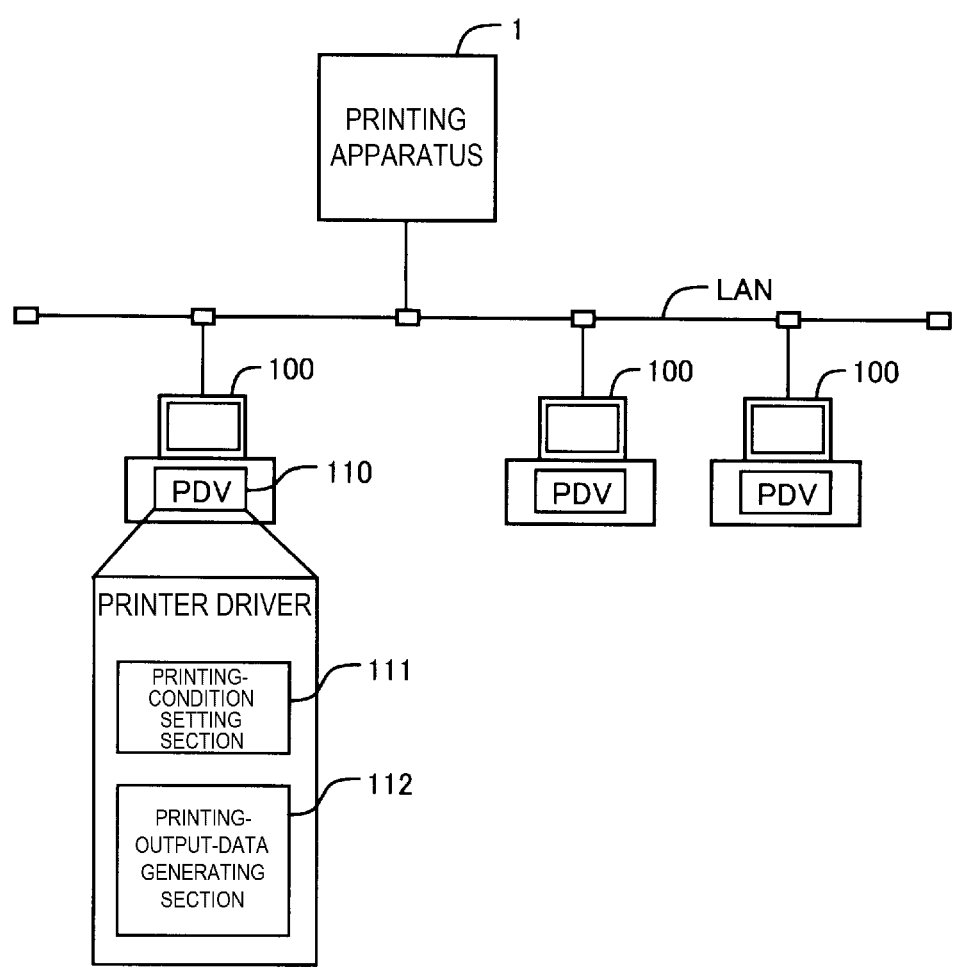
FIG. 2 is a block diagram of a network system including a printing apparatus and a plurality of computers.

FIG. 2 is a block diagram of a network system including the printing apparatus 1 and a plurality of computers 100. The printing apparatus 1 and the plurality of computers 100 are coupled to each other via a local area network. A printer driver 110 for the printing apparatus 1 is installed in the computers 100. The printer driver 110 includes a printing-condition setting section 111 that sets a printing condition for the printing apparatus 1 and a printing-output-data generating section 112 that creates printing output data.

Figure 3:
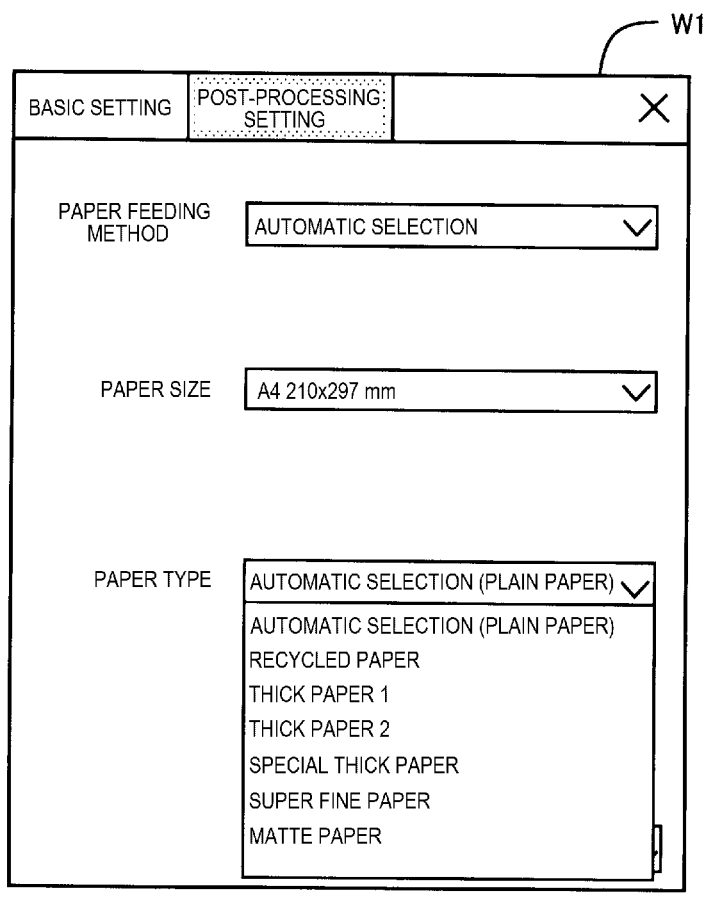
FIG. 3 is an explanatory diagram showing a basic setting screen for printing conditions.

FIG. 3 is an explanatory diagram showing a printing condition setting screen of the printer driver 110. The printing condition setting screen is displayed on a display of the computer 100 by the printing-condition setting section 111. The printing-condition setting screen is switched to any one of a plurality of screens including a basic setting screen W1 shown in FIG. 3 and a post-processing setting screen explained below.

The basic setting screen W1 includes a plurality of setting items including a paper feeding method, a paper size, and a paper type. In FIG. 3, the paper feeding method is set to "automatic selection" and the paper size is set to "A4". Concerning the paper type, a selectable plurality of options are displayed as a pulldown menu. In this example, as the options of the paper type, "automatic selection (plain paper)", "recycled paper", "thick paper 1", "thick paper 2", "special thick paper", "super fine paper", and "matte paper" are prepared. The "thick paper 1", the "thick paper 2", and the "special thick paper" mean kinds of paper having thicknesses different from one another. In the present disclosure, the thicknesses are larger in the order of the "special thick paper", the "thick paper 2", and the "thick paper 1". Paper types other than these types may be displayed as options. The "automatic selection" is an item, a setting value of which is automatically selected according to other settings. When the setting value of the item is not determined according to the other settings, an initial setting value is used. The initial setting value of the paper type is, for example, "plain paper". The basic setting screen W1 may include, as other setting items, setting of color/monochrome printing, setting of printing quality, and setting of simplex/duplex printing.

Figure 4:
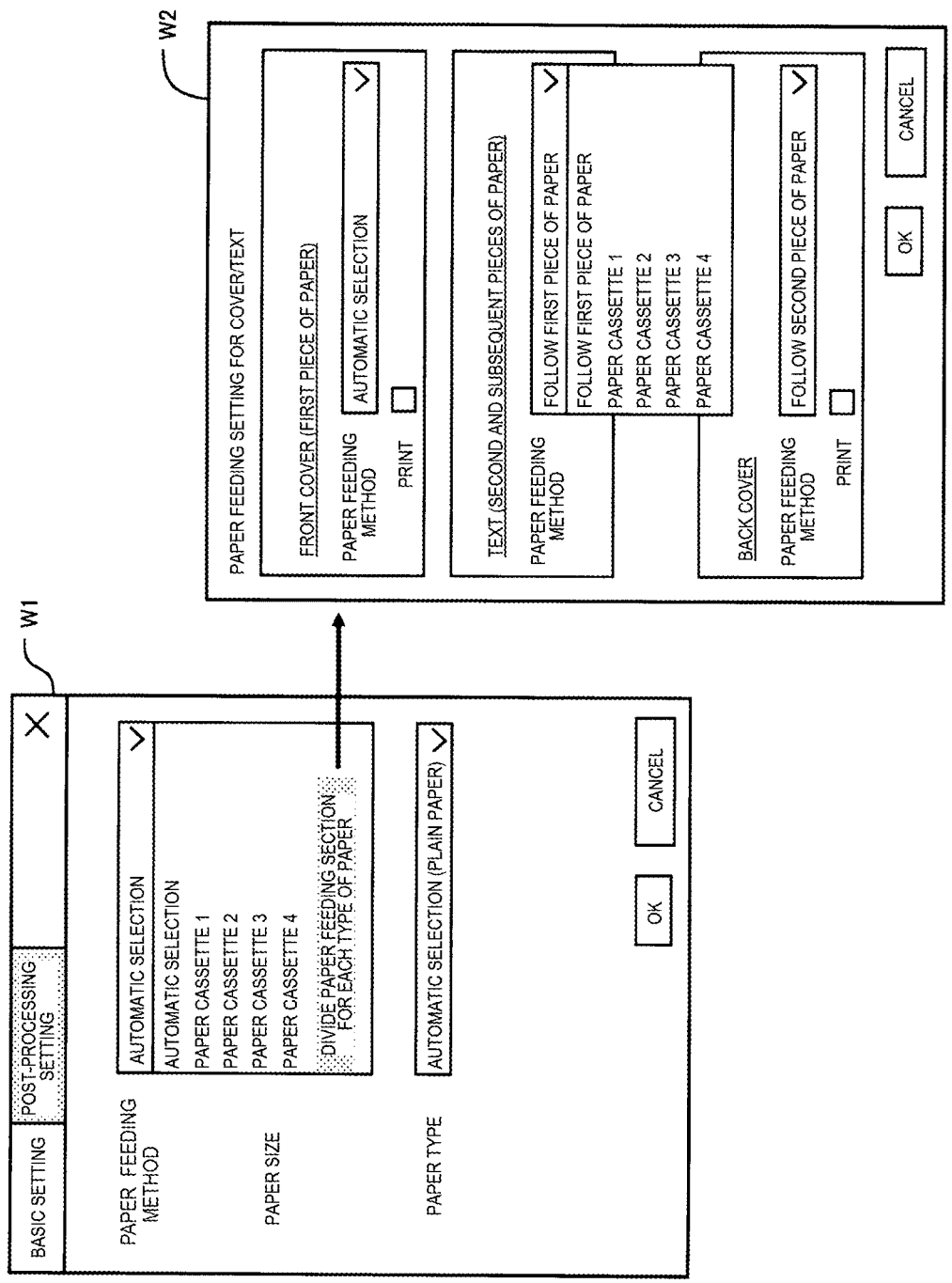
FIG. 4 is an explanatory diagram showing a state in which a printing condition concerning a paper feeding method is set.

FIG. 4 is an explanatory diagram showing a state in which a printing condition concerning a paper feeding method is set. In the basic setting screen W1, options of the paper feeding method include "automatic selection", "paper cassette 1" to "paper cassette 4", and "divide a paper feeding section for each type of paper". The "paper cassette 1" to the "paper cassette 4" mean paper cassettes 51 to 54 of the printing apparatus 1.

When a user selects the "divide a paper feeding section for each type of paper" out of the options of the paper feeding method on the basic setting screen W1, a paper feeding setting screen W2 is displayed separately from the basic setting screen W1. The paper feeding setting screen W2 is a screen on which paper feeding setting for a cover/a text is performed. The paper feeding setting screen W2 includes a setting item for a front cover, a setting item for a text, and a setting item for a back cover. These setting items respectively include settings for paper feeding methods. The front cover and the back cover further include setting concerning whether to perform printing. Options of the paper feeding method for the front cover include, although a part of illustration is omitted, "automatic selection" and "paper cassette 1" to "paper cassette 4". Options of the paper feeding method for the text include "follow the first paper" and "paper cassette 1" to "paper cassette 4". The "first paper" means the front cover. Options of the paper feeding method for the back cover include, although a part of illustration is omitted, "follow the second paper" and "paper cassette 1" to "paper cassette 4". The "second paper" means the text. The setting items for the back cover may be omitted from the paper feeding setting screen W2.

The user is capable of respectively setting the paper feeding method for the front cover, the text, and the back cover using the paper feeding setting screen W2. In this embodiment, it is assumed that paper cassettes different from each other are set as the paper feeding methods for the front cover and the text. Among the plurality of paper cassettes 51 to 54 of the printing apparatus 1, a paper cassette selected for paper for text on the paper feeding setting screen W2 is referred to as "first paper feeding section" and a paper cassette selected for paper for front cover on the paper feeding setting screen W2 is referred to as "second paper feeding section". For example, the paper cassette 51 is selected as the "first paper feeding section" for the paper for text and the paper cassette 52 is selected as the "second paper feeding section" for the paper for front cover. A simple term "cover" means the front cover.

When the user selects "divide a paper feeding section for each type of paper" out of the options for the paper feeding method on the basic setting screen W1 as shown in FIG. 4, it is preferable that the paper type is automatically set to a specific option selected in advance. The specific option means that a specific paper type common to the text and the cover is designated. In particular, if the "automatic selection" is used as the specific option for the paper type, it is possible to prevent individual setting of paper feeding sections for the cover and the text and setting of the paper type from contradicting. However, even when the user selects the "divide a paper feeding section for each type of paper" as the paper feeding method, the user may be able to select any option for the paper type.

Figure 5:
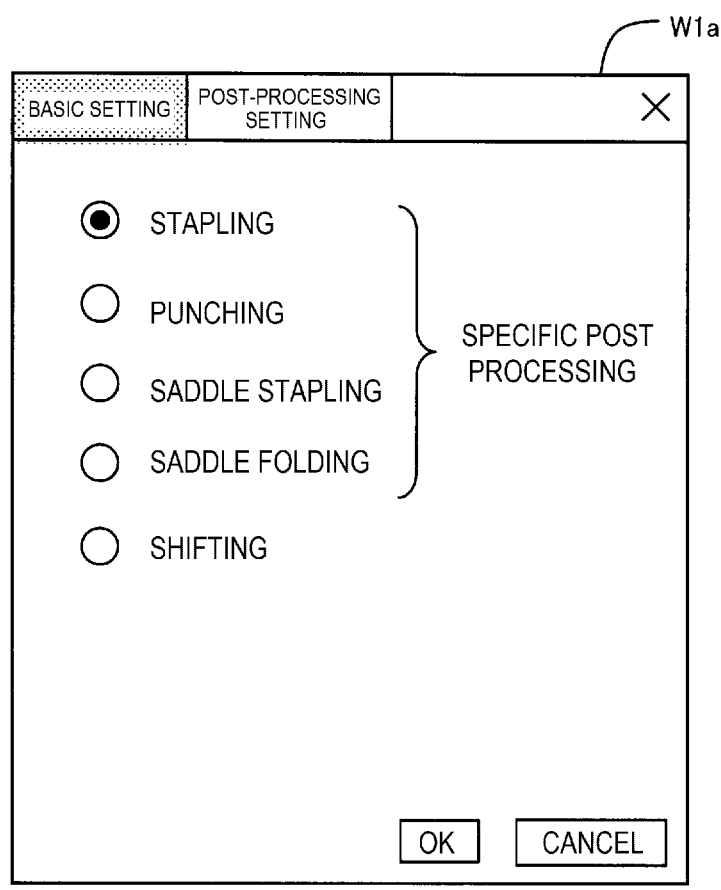
FIG. 5 is an explanatory diagram showing a post-processing setting screen.

FIG. 5 is an explanatory diagram showing a state of post-processing setting performed using a post-processing setting screen W1a. As explained above, the post-processing unit 3 is capable of executing, as the post processing, any one of "stapling", "punching", "saddle stapling", "saddle folding", and "shifting". On the post-processing setting screen W1a, one post processing is selected out of the plurality of kinds of post-processing. Among the five kinds of post processing, the "stapling", the "punching", the "saddle stapling", and the "saddle folding" excluding the "shifting" are selected in advance as "specific post processing". The "specific post processing" is one or more kinds of post-processing selected in advance out of kinds of post processing executable by the post-processing unit 3. The significance of the "specific post processing" is explained below.

When execution of printing is instructed by a user of the computer 100 after printing conditions are set, the printing-output-data generating section 112 of the printer driver 110 creates printing output data according to the printing conditions. The printing output data is supplied from the computer 100 to the printing apparatus 1.

Figure 6:
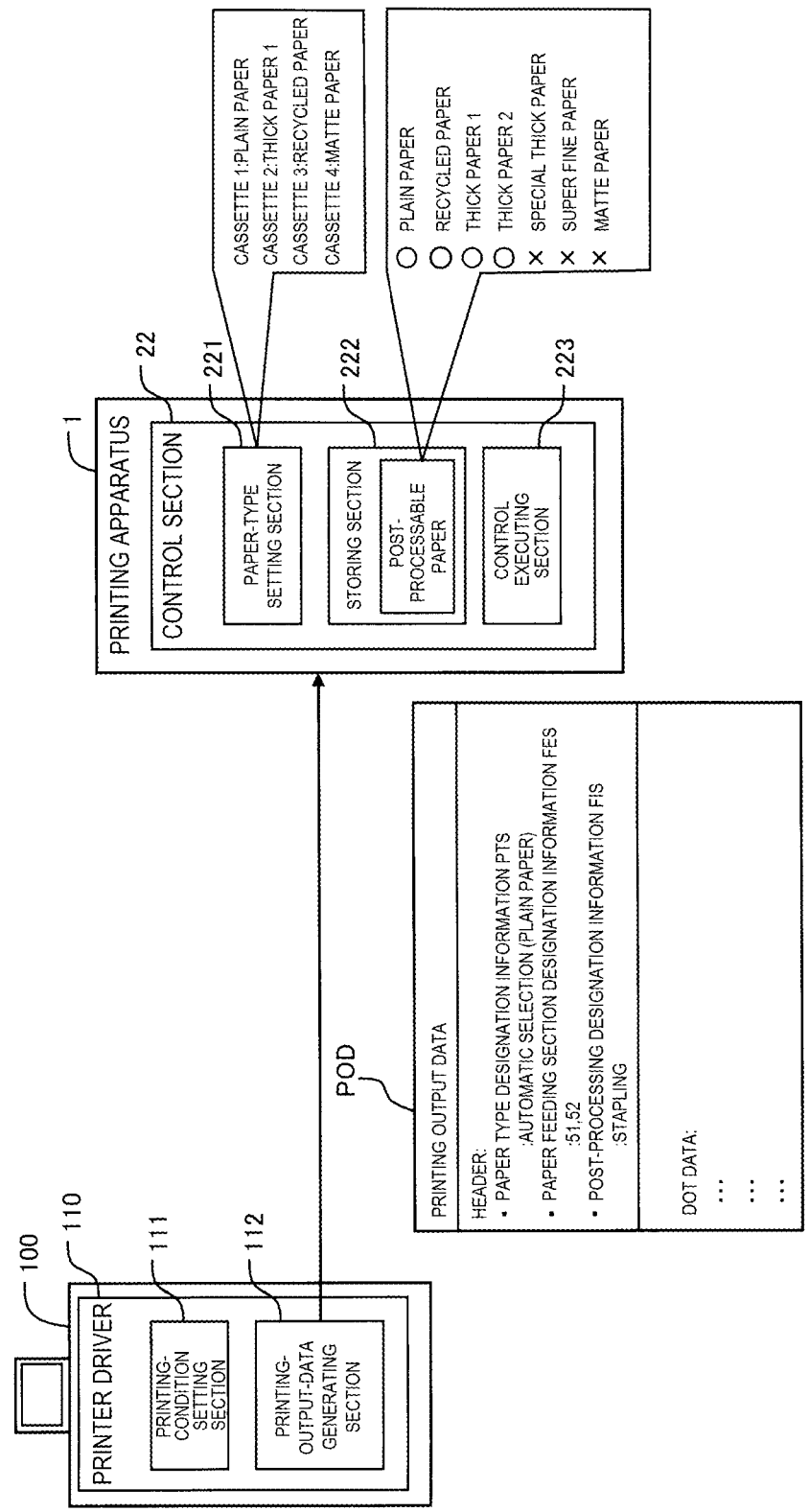
FIG. 6 is a block diagram showing functions of the computer and the printing apparatus.

FIG. 6 is a block diagram showing functions of the computer 100 and the printing apparatus 1. The printing-output-data generating section 112 of the printer driver 110 creates printing output data POD and supplies the printing output data POD to the printing apparatus 1. The control section 22 of the printing apparatus 1 includes a paper-type setting section 221, a storing section 222, and a control executing section 223. The control executing section 223 has a function of executing control of the printing apparatus 1 according to the printing output data POD.

The printing output data POD includes a header and a body including dot data. The dot data is data representing presence or absence of formation of dots in pixels on the paper P and a dot size. The dot size means an ejection amount of ink. Since the dot size depends on surface characteristics of the paper P, the dot data is different in the plain paper, the super fine paper, and the matte paper. However, in the plain paper, the recycled paper, the thick paper 1 and the thick paper 2, and the special thick paper, since surface characteristics thereof are substantially the same, the dot data is the same.

The header of the printing output data POD includes paper type designation information PTS, paper feeding section designation information FES, and post-processing designation information FIS. The paper type designation information PTS is data for designating a paper type of paper used for printing. In FIG. 6, the paper type designation information PTS designates "automatic selection (plain paper)". The paper feeding section designation information FES is data for designating a first paper feeding section for the paper for text and a second paper feeding section for the paper for cover. In FIG. 6, the paper feeding section designation information FES designates the paper cassette 51 as the first paper feeding section for the paper for text and designates the paper cassette 52 as the second paper feeding section for the paper for cover. The paper feeding section designation information FES may include designation of a third paper feeding section for a back cover. The post-processing designation information FIS is data for designating one of non-implementation of post processing and selection of post processing executed by the post-processing unit 3. In FIG. 6, the post-processing designation information FIS designates the "stapling".

The paper-type setting section 221 of the printing apparatus 1 displays, on a not-shown operation panel of the printing apparatus 1, a screen for setting paper types of the paper P placed on the plurality of paper cassettes 51 to 54 of the printing apparatus 1. The paper-type setting section 221 sets, in the printing apparatus 1, a paper type designated by the user using the operation panel. In FIG. 6, paper types of the paper cassettes 51 to 54 are respectively set to the "plain paper", the "thick paper 1", the "recycled paper", and the "matte paper".

The storing section 222 of the printing apparatus 1 stores a plurality of paper types for which the specific post processing by the post-processing unit 3 is possible. As explained above with reference to FIG. 5, the "specific post processing" means one or more kinds of post processing selected in advance out of the kinds of post processing executable by the post-processing unit 3. In this embodiment, among the plurality of kinds of post processing executable by the post-processing unit 3, five kinds of post processing excluding the "shifting" are selected in advance as the "specific post processing". As shown in FIG. 3, in the printer driver 110, the paper types usable by the printing apparatus 1 include the "plain paper", the "recycled paper", the "thick paper 1", the "thick paper 2", the "special thick paper", the "super fine paper", and the "matte paper". In FIG. 6, among the plurality of paper types, the "plain paper", the "recycled paper", the "thick paper 1", and the "thick paper 2" are stored in the storing section 222 as paper types for which the "specific post processing" by the post-processing unit 3 is possible. On the other hand, the "special thick paper", the "super fine paper", and the "matte paper" are stored in the storing section 222 as paper types for which the "specific post processing" by the post-processing unit 3 is impossible. The paper types for which the specific post processing by the post-processing unit 3 is impossible do not need to be stored in the storing section 222. Rather than storing the paper types usable in the one "specific post processing" including a plurality of the post processing, usable paper types may be stored for each kind of post processing. In the case of the "saddle stapling" and the "saddle folding", the "thick paper 2" for which folding is difficult may be stored without being included in usable paper types.

Figure 7:
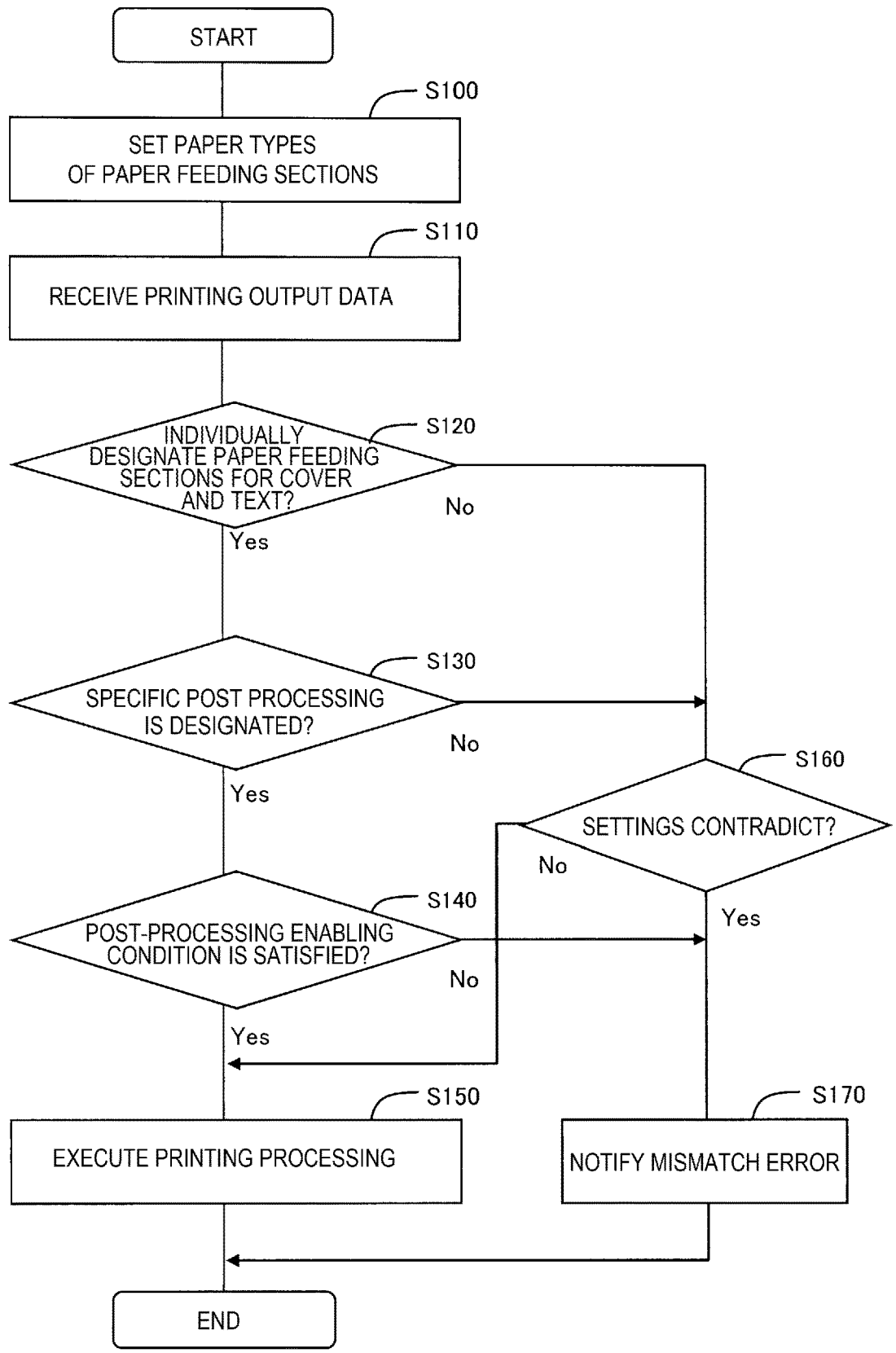
FIG. 7 is a flowchart showing the operation of the printing apparatus.

FIG. 7 is a flowchart showing the operation of the printing apparatus 1. Step S100 is a preparation operation performed before reception of the printing output data POD. Step S110 and subsequent step are operations corresponding to the printing output data POD.

In step S100, the user sets paper types of the paper feeding sections using the paper-type setting section 221 of the printing apparatus 1. The "paper feeding sections" mean the paper cassettes 51 to 54 of the printing apparatus 1. In FIG. 6, paper types of the paper cassettes 51 to 54 are respectively set to the "plain paper", the "thick paper 1", the "recycled paper", and the "matte paper".

In step S110, the control section 22 of the printing apparatus 1 receives the printing output data POD. In step S120, the control section 22 determines whether paper feeding sections for a cover and a text are individually designated by the paper feeding section designation information FFS of the printing output data POD. When paper feeding section for a cover and a text are not individually designated, processing of the flowchart proceeds to step S160 and the control section 22 determines whether various settings designated by the printing output data POD and various settings designated in advance by the printing apparatus 1 contradict each other. When the settings do not contradict each other, the processing proceeds to step S150 and the control executing section 223 executes printing processing conforming to the printing output data POD. When the settings contradict each other, the control section 22 notifies a mismatch error to the user and ends the processing. The control section 22 notifies the mismatch error by displaying indication of the mismatch error on the operation panel of the printing apparatus 1. Alternatively, the control section 22 may supply information indicating the mismatch error to the computer 100 at a transmission source of the printing output data POD and cause a display section of the computer 100 to display the information. In the notification of the mismatch error, it is preferable to present measures that can be taken in order to solve the mismatch error. When the user receives the notification of the mismatch error and the measures for solving the mismatch error are executed, the printing apparatus 1 executes the printing processing.

When it is determined in step S120 that paper feeding sections for a cover and a text are individually designated, the processing proceeds to step S130 and the control section 22 determines whether execution of the specific post processing is designated by the post processing designation information FIS. When execution of the specific post processing is not designated, the processing proceeds to step S160 explained above. On the other hand, when execution of the specific post processing is designated, the processing proceeds to step S140 and the control section 22 determines whether a condition determined in advance as a condition for enabling the post processing is satisfied. In the following explanation, the condition for enabling the specific post processing is simply referred to as "post-processing enabling condition". The post-processing enabling condition is explained below. When the post-processing enabling condition is not satisfied, the processing proceeds to step S170 and the control section 22 executes the notification of the mismatch error. When the post-processing enabling condition is satisfied, the processing proceeds to step S150 and the control executing section 223 controls the printing unit 2 and the post-processing unit 3 and executes printing processing according to the paper feeding section designation information FES and the post-processing designation information FIS irrespective of designation by the paper type designation information PTS of the printing output data POD.

As the post-processing enabling condition, any one of condition examples explained below can be used.

Post-Processing Enabling Condition 1 i. The paper type set by the paper-type setting section 221 for the second paper feeding section for the paper for cover designated by the paper feeding section designation information FES coincides with any one of a post-processable plurality of paper types stored in the storing section 222.

In this condition example 1, it is assumed that, as shown in FIG. 6, the second paper feeding section for the paper for cover designated by the paper feeding section designation information FES is the second paper cassette 52 and a paper type set by the paper-type setting section 221 for the paper cassette 52 is the "thick paper 1". In this case, the "thick paper 1" corresponds to one of the post-processable plurality of paper types stored in the storing section 222. Therefore, the control section 22 determines in step S140 that the post-processing enabling condition is satisfied and executes step S150. However, when executing step S150 through step S140, in step S150, the control section 22 executes printing and post processing according to the paper feeding section designation information FES and the post-processing designation information FIS irrespective of designation by the paper type designation information PTS of the printing output data POD. The control by the control section 22 in the printing and the post processing is referred to as "operation control". The wording "irrespective of designation by the paper type designation information PTS of the printing output data POD" means that designation by the paper type designation information PTS of the printing output data POD is neglected. If such processing is executed, when a paper type of the second paper for the paper for cover is a paper type for which the specific post processing is possible, the printing and the post processing are performed without using the paper type designated by the paper type designation information PTS. Therefore, it is possible to obtain a post-processed print intended by the user.

Post-Processing Enabling Condition 2 i. The paper type designated by the paper type designation information PTS is "automatic selection (plain paper)" and the paper type set by the paper-type setting section 221 for the second paper feeding section for the paper for cover designated by the paper feeding section designating information FES coincides with any one of the plurality of post-processable paper types stored in the storing section 222, and ii. The paper type designated by the paper type designation information PTS is "automatic selection (plain paper)" and the paper type set by the paper-type setting section 221 for the first paper feeding section for the paper for text designated by the paper feeding section designation information FES is the same as the paper type designated by the paper type designation information PTS.

The paper type designation information PTS in i and ii of the condition example 2 is the same "automatic selection". Concerning ii of the condition example 2, it is assumed that, as shown in FIG. 6, the first paper feeding section for the paper for text designated by the paper feeding section designation information FES is the first paper cassette 51 and the paper type set by the paper-type setting section 221 for the paper cassette 51 is the "plain paper". The "plain paper" coincides with the "automatic selection (plain paper)", which is the paper type designated by the paper type designation information PTS. Therefore, the control section 22 determines in step S140 that the post-processing enabling condition is satisfied and executes step S150. On the other hand, when the paper type set by the paper-type setting section 221 for the paper cassette 51 is other than the "plain paper", the paper type is different from the "automatic selection (plain paper)", which is the paper type designated by the paper type designation information PTS. In this case, since the control section 22 determines in step S140 that the post-processing enabling condition is not satisfied, the control section 22 notifies the mismatch error in step S170 without executing the printing and the post processing. If such processing is executed, when the paper type of the second paper for the text is different from the paper type designated by the paper type designation information PTS, the printing and the post processing conforming to the printing output data POD are not performed. Therefore, it is possible to prevent a print different from a print intended by the user from being created. When the "stapling" is selected as the "specific post processing", a processing range in which stapling is possible is determined by total thickness of a print to be stapled. The number of pieces of paper that can be stapled when the "thick paper" is selected for the text is smaller than the number of pieces of paper that can be stapled when the "plain paper" is selected for the text. Accordingly, it is likely that a necessary number of pieces of paper cannot be stapled.

As the post-processing enabling condition, various conditions other than the condition examples 1 and 2 explained above can be set in advance. As the post-processing enabling condition, it is preferable to use a condition including at least i explained above.

As explained with reference to FIG. 6, the paper types for which the "specific post processing" is possible are the four paper types, that is, the "plain paper", the "recycled paper", the "thick paper 1", and the "thick paper 2". On the other hand, five paper types including the "special thick paper" in addition to these four paper types are a group of paper types for which printing can be performed with the same dot data. This is because, since surface characteristics of the five paper types are substantially the same, the dot data is the same. It is preferable that the group of paper types for which the "specific post processing" is possible is a part of a group of paper types for which printing can be executed with the same dot data. Then, there is an advantage that, since the control section 22 determines in step S140 in FIG. 7 whether the post-processing enabling condition is satisfied, it is unnecessary to determine whether printing can be executed with the same dot data.

As explained with reference to FIG. 5, the "shifting" sometimes can be selected as the post processing executed by the post-processing unit 3. Paper types for which the "shifting" can be executed are limited. However, when the "shifting" is performed, it is preferable that the notification of the mismatch error is not performed even if the mismatch error is present. This is because the user can carry out the "shifting" later. When a paper type of paper placed on the second paper feeding section for the paper for cover is a paper type for which the shifting cannot be executed, the paper may be discharged without performing the shifting.

As explained above, when the post-processing designation information FIS designates the selection of the specific post processing and predetermined conditions including a condition that the paper type of the second paper for the cover set by the paper-type setting section 221 coincides with any one of the plurality of paper types stored as being post-processable in the storing section 222 are satisfied, the operation control for controlling the printing unit 2 and the post-processing unit 3 is executed according to the paper feeding section designation information FES and the post-processing designation information FIS irrespective of the designation by the paper type designation information PTS. That is, when the paper type of the second paper for the cover is a paper type for which the specific post processing is possible, the printing and the post processing are performed without using the paper type designated by the paper type designation information PTS. As a result, it is possible to obtain a post-processed print intended by the user.

Other Embodiments

The present disclosure is not limited to the embodiment explained above and can be realized in various aspects without departing from the gist of the present disclosure. The present disclosure can also be realized by aspects explained below. Technical features in the embodiment corresponding to technical features in the aspects explained below can be substituted or combined as appropriate in order to solve all or a part of the problems or in order to achieve a part or all of the effects. Unless the technical features are explained as essential technical features in this specification, the technical features can be deleted as appropriate.

A printing apparatus according to an aspect includes: a printing unit including a first paper feeding section on which first paper is placed, a second paper feeding section on which second paper is placed, and a printing section configured to execute printing according to printing output data; a post-processing unit configured to execute post processing on the first paper and the second paper; and a control section configured to control the printing unit and the post-processing unit. The control section includes: a paper-type setting section configured to set a paper type of the first paper and a paper type of the second paper; a storing section configured to store a plurality of paper types for which specific post processing by the post-processing unit is possible; and a control executing section configured to execute control according to the printing output data. The printing output data includes paper type designation information for designating paper types of paper for text and paper for cover used for printing, paper feeding section designation information for designating the first paper feeding section as a paper feeding section for the paper for text and designating the second paper feeding section as a paper feeding section for the paper for cover, and post-processing designation information for designating one of non-implementation of the post processing and selection of the post processing executed by the post-processing unit. When the post-processing designation information designates the selection of the specific post processing and predetermined conditions including a condition that the paper type of the second paper set by the paper-type setting section coincides with any one of the plurality of paper types stored in the storing section are satisfied, the control executing section executes operation control for controlling the printing unit and the post-processing unit according to the paper feeding section designation information and the post-processing designation information irrespective of the designation by the paper type designation information.

When the paper type of the second paper for the cover is a paper type for which the specific post processing is possible, the printing and the post processing are performed without using the paper type designated by the paper type designation information. Therefore, it is possible to obtain a post-processed print intended by the user.

When the post-processing designation information designates the selection of the specific post processing and the paper type of the first paper set by the paper-type setting section is different from the paper type designated by the paper type designation information, the control executing section may not execute the operation control and may not execute the control of the printing unit and the post-processing unit conforming to the printing output data.

When the paper type of the second paper for the text is different from the paper type designated by the paper type designation information, since the printing and the post processing conforming to the printing output data are not performed, it is possible to prevent a print different from a print intended by the user from being created.

When the paper feeding section designation information designates the paper feeding section for the paper for text and the paper feeding section for the paper for cover, the designation of the paper type by the paper type designation information may be specific paper type designation common to the paper for text and the paper for cover.

Even when the specific paper type designation is performed for the paper for text and the paper for cover, the printing and the post processing are performed without using the paper type designation. Therefore, it is possible to obtain a post-processed print intended by the user.

The specific paper type designation may be automatic selection.

Even when both of the paper types for the paper for text and the paper for cover are designated as the automatic selection, the printing and the post processing are performed without using the paper type designation. Therefore, it is possible to obtain a post-processed print intended by the user.

The specific post processing may be any one of stapling, punching, saddle stapling, and saddle folding.

When any one of the stapling the punching, the saddle staling, and the saddle folding is designated as the post processing, it is also possible to obtain a post-processed print intended by the user.

A method of controlling a printing apparatus including a post-processing unit is provided. This method includes: a setting step of setting, in the printing apparatus, a paper type of first paper placed on a first paper feeding section and a paper type of second paper placed on a second paper feeding section; and a post-processing step of executing printing according to printing output data and further executing post processing on the first paper and the second paper. The printing output data includes paper type designation information for designating a paper type of paper for text and a paper type of paper for cover used for the printing, paper feeding section designation information for designating the first paper feeding section as a paper feeding section for the paper for text and designating the second paper feeding section as a paper feeding section for the paper for cover, and post-processing designation information for designating one of non-implementation of the post processing and selection of the post processing executed by the post-processing unit. The post-processing step includes a step of, when the post-processing designation information designates selection of specific post processing and predetermined conditions including a condition that the paper type of the second paper set in the setting step coincides with any one of a plurality of paper types stored in advance as paper types for which the specific post processing is possible are satisfied, controlling the printing and the post processing according to the paper feeding section designation information and the post-processing designation information irrespective of the designation by the paper type designation information.

When the paper type of the second paper for the cover is a paper type for which the specific post processing is possible, the printing and the post processing are performed without using the paper type designated by the paper type designation information. Therefore, it is possible to obtain a post-processed print intended by the user.

The post-processing step may include a step of, when the post-processing designation information designates the selection of the specific post processing and the paper type of the first paper set in the setting step is different from the paper type designated by the paper type designation information, not executing the operation control and not executing the control of the printing and the post processing conforming to the printing output data.

When the paper type of the second paper for the text is different from the paper type designated by the paper type designation information, since the printing and the post processing conforming to the printing output data are not performed, it is possible to prevent a print different from a print intended by the user from being created.

When the paper feeding section designation information designates the paper feeding section for the paper for text and the paper feeding section for the paper for cover, the designation of the paper type of the paper for text and the paper type of the paper for cover by the paper type designation information may be designation of a common specific paper type.

In some case, pieces of paper of paper types different from each other are placed on the paper feeding section for the paper for text and the paper feeding section for the paper for cover designated by the paper feeding section designation information. In this case, when the paper type of the second paper for the cover is a paper type for which the specific post processing is possible, the printing and the post processing are performed without using the paper type designated by the paper type designation information. Therefore, it is possible to obtain a post-processed print intended by the user.

The designation of the specific paper type may be automatic selection.

Even when both of the paper types for the paper for text and the paper for cover are designated as the automatic selection, the printing and the post processing are performed without using the paper type designation. Therefore, it is possible to obtain a post-processed print intended by the user.

The specific post processing may be any one of stapling, punching, saddle stapling, and saddle folding.

When any one of the stapling, the punching, the saddle staling, and the saddle folding is designated as the post processing, it is also possible to obtain a post-processed print intended by the user.

What is claimed is:

1. A printing apparatus comprising:
a printing unit including a first paper feeding section on which first paper is placed, a second paper feeding section on which second paper is placed, and a printing section configured to execute printing according to printing output data;
a post-processing unit configured to execute one or more post processing, including a specific post processing, on a stack of paper including the first paper and the second paper stacked on top of the first paper; and
a controller configured to control the printing unit and the post-processing unit, wherein the controller includes:
a paper-type setting section configured to set a paper type of the first paper and a paper type of the second paper;
a storing section configured to store a plurality of paper types for which the specific post processing by the post-processing unit is possible; and
a control executing section configured to execute control according to the printing output data,
the printing output data includes:
paper type designation information that designates a first paper type of paper for text and a second paper type of paper for cover used for printing;
paper feeding section designation information that designates the first paper feeding section as a paper feeding section for the first paper for the text and designates the second paper feeding section as a paper feeding section for the second paper for the cover; and
post-processing designation information that designates one of non-implementation of the post processing and selection of the post processing executed by the post-processing unit, and
when the post-processing designation information designates the selection of the specific post processing and the second paper type set by the paper-type setting section coincides with any one of the plurality of paper types stored in the storing section, the control executing section executes operation control that controls the printing unit and the post-processing unit according to the paper feeding section designation information and the post-processing designation information, regardless of the first paper type set by the paper type designation information.

2. The printing apparatus according to claim 1, wherein, when the post-processing designation information designates the selection of the specific post processing and the paper type of the first paper set by the paper-type setting section is different from the paper type of the paper for the text designated by the paper type designation information, the control executing section does not execute the operation control and does not execute the control of the printing unit and the post-processing unit conforming to the printing output data.

3. The printing apparatus according to claim 1, wherein, when the paper feeding section designation information designates the paper feeding section for the paper for the text and the paper feeding section for the paper for the cover, the designation of the paper type of the paper for the text and the designation of the paper type of the paper for the cover by the paper type designation information are designation of a common specific paper type.

4. The printing apparatus according to claim 3, wherein the designation of the specific paper type is automatic selection.

5. The printing apparatus according to claim 1, wherein the specific post processing is any one of stapling, punching, saddle stapling, and saddle folding.

6. A method of controlling a printing apparatus including a post-processing unit configured to execute one or more post processing including a specific post processing, the method comprising:
storing a plurality of paper types for which the specific post processing by the post-processing unit is possible;
setting, in the printing apparatus, a paper type of first paper placed on a first paper feeding section and a paper type of second paper placed on a second paper feeding section;
executing printing according to printing output data; and
executing the post processing on a stack of paper including the first paper and the second paper stacked on top of the first paper, wherein
the printing output data includes:
paper type designation information that designates a first paper type of paper for text and a second paper type of paper for cover used for the printing;
paper feeding section designation information that designates the first paper feeding section as a paper feeding section for the first paper for the text and designates the second paper feeding section as a paper feeding section for the second paper for the cover; and
post-processing designation information that designates one of non-implementation of the post processing and selection of the post processing executed by the post-processing unit, and
when the post-processing designation information designates selection of the specific post processing the second paper type of the second paper set coincides with any one of the plurality of paper types controlling the printing and the post processing according to the paper feeding section designation information and the post-processing designation information, regardless of the first paper type set by the paper type designation information.

7. The method according to claim 6, wherein
when the post-processing designation information designates the selection of the specific post processing and the paper type of the first paper set in the printing apparatus is different from the paper type of the paper for the text designated by the paper type designation information, not executing control of the printing and the post processing according to the paper feeding section designation information and the post-processing designation information and not executing the control of the printing and the post processing conforming to the printing output data.

8. The method according to claim 6, wherein,
when the paper feeding section designation information designates the paper feeding section for the paper for the text and the paper feeding section for the paper for the cover, the designation of the paper type of the paper for the text and the paper type of the paper for the cover by the paper type designation information are designation of a common specific paper type.

9. The method according to claim 8, wherein
the designation of the specific paper type is automatic selection.

10. The method according to claim 6,
wherein the specific post processing is any one of stapling, punching, saddle stapling, and saddle folding.

\* \* \* \* \*